US010318574B1

(12) United States Patent
Bonechi et al.

(10) Patent No.: US 10,318,574 B1
(45) Date of Patent: Jun. 11, 2019

(54) GENERATING MOMENTS

(71) Applicant: Google Inc., Mountain View, CA (US)

(72) Inventors: Marco Bonechi, Mountain View, CA (US); Christopher Lauritzen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 685 days.

(21) Appl. No.: 14/659,283

(22) Filed: Mar. 16, 2015

(51) Int. Cl.
| | |
|---|---|
| *G06K 9/00* | (2006.01) |
| *G06F 16/583* | (2019.01) |
| *G06F 16/955* | (2019.01) |
| *G06F 3/0484* | (2013.01) |
| *G06F 16/29* | (2019.01) |
| *G06F 16/44* | (2019.01) |

(52) U.S. Cl.
CPC ...... *G06F 16/5838* (2019.01); *G06F 3/04842* (2013.01); *G06F 16/29* (2019.01); *G06F 16/447* (2019.01); *G06F 16/955* (2019.01); *G06K 9/00684* (2013.01)

(58) Field of Classification Search
CPC .......... G06F 17/30601; G06F 16/5838; G06F 3/04842; G06F 16/29; G06F 16/447; G06F 16/955; G06K 9/00684
See application file for complete search history.

(56) References Cited

U.S. PATENT DOCUMENTS

| | | | |
|---|---|---|---|
| 2005/0088542 A1* | 4/2005 | Stavely | H04N 5/232 |
| | | | 348/239 |
| 2011/0158605 A1 | 6/2011 | Bliss et al. | |
| 2011/0176788 A1 | 7/2011 | Bliss et al. | |
| 2012/0159326 A1* | 6/2012 | Mital | G06F 17/30058 |
| | | | 715/716 |
| 2013/0156275 A1 | 6/2013 | Amacker et al. | |
| 2013/0339868 A1 | 12/2013 | Sharpe et al. | |
| 2014/0192230 A1* | 7/2014 | Chang | H04N 1/2112 |
| | | | 348/231.4 |
| 2014/0250126 A1 | 9/2014 | Baldwin et al. | |
| 2015/0193409 A1* | 7/2015 | Portnoy | G06F 17/24 |
| | | | 715/202 |
| 2015/0237268 A1* | 8/2015 | Vaiaoga | H04N 5/265 |
| | | | 348/218.1 |

* cited by examiner

*Primary Examiner* — William L Bashore
*Assistant Examiner* — Daniel W Parcher
(74) *Attorney, Agent, or Firm* — IP Spring

(57) ABSTRACT

Implementations generally relate to generating moments. In some implementations, a method includes generating a moment, where the moment includes one or more visual content items. The method further includes determining one or more other types of content items in response to the generating of the moment. The method further includes associating the one or more other types of content items with the moment.

20 Claims, 5 Drawing Sheets

GENERATING MOMENTS

BACKGROUND

Some media systems enable users to upload media content such as photos, and enable users to create photo albums. Such systems also enable users to share photos with each other. For example, users can share photos with friends and family, which provides enjoyable and bonding experiences among users.

SUMMARY

Implementations generally relate to generating moments. In some implementations, a method includes generating a moment, where the moment includes one or more visual content items. The method further includes determining one or more other types of content items in response to the generating of the moment. The method further includes associating the one or more other types of content items with the moment.

With further regard to the method, in some implementations, the generating of the moment is triggered by a detection of a photo capture process associated with the one or more visual content items. In some implementations, the generating of the moment is triggered by a detection of a photo capture process associated with the one or more visual content items, and where the detection of the photo capture process includes detecting a preview of the one or more visual content items. In some implementations, the one or more other types of content items include at least one audio content item, where the at least one audio content item was created during a time interval associated with a time of capture of at least one of the visual content items of the moment. In some implementations, the one or more other types of content items include geographic information, where the geographic information is associated with a geographic region where at least one of the visual content items of the moment was captured. In some implementations, the one or more other types of content items include at least one audio content item, where the determining of the at least one audio content item starts when a preview of one or more of the visual content items is detected. In some implementations, the method further includes rendering a first user interface that enables user identification of a first moment; upon receipt of the user identification of the first moment, accessing a first set of content items associated with the first moment in a moment data structure; determining a first set of content item types associated with the first set of content items; and dynamically configuring and rendering a second user interface for presentation of the first set of content items, where the configuring of the second user interface is based on the first set of content item types. In some implementations, the first set of content item types includes a photo content item type, a video content item type, and an audio content item type, and where the configuring of the second user interface includes: displaying one or more of an image viewer and a video player on the second user interface; and activating an audio player concurrently with presentation of the second user interface.

In some implementations, a non-transitory computer-readable storage medium carries program instructions thereon, where the instructions when executed by one or more processors cause the one or more processors to perform operations including: generating a moment, where the moment includes one or more visual content items; determining one or more other types of content items in response to the generating of the moment; and associating the one or more other types of content items with the moment.

With further regard to the computer-readable storage medium, in some implementations, the generating of the moment is triggered by a detection of a photo capture process associated with the one or more visual content items. In some implementations, the generating of the moment is triggered by a detection of a photo capture process associated with the one or more visual content items, and where the detection of the photo capture process includes detecting a preview of the one or more visual content items. In some implementations, the one or more other types of content items include at least one audio content item, where the at least one audio content item was created during a time interval associated with a time of capture of at least one of the visual content items of the moment. In some implementations, the one or more other types of content items include geographic information, where the geographic information is associated with a geographic region where at least one of the visual content items of the moment was captured. In some implementations, the one or more other types of content items include at least one audio content item, where the determining of the at least one audio content item starts when a preview of one or more of the visual content items is detected. In some implementations, the instructions further cause the one or more processors to perform operations including rendering a first user interface that enables user identification of a first moment; upon receipt of the user identification of the first moment, accessing a first set of content items associated with the first moment in a moment data structure; determining a first set of content item types associated with the first set of content items; and dynamically configuring and rendering a second user interface for presentation of the first set of content items, where the configuring of the second user interface is based on the first set of content item types.

In some implementations, a system includes one or more processors, and logic encoded in one or more tangible media for execution by the one or more processors. When executed, the logic is operable to perform operations including: generating a moment, where the moment includes one or more visual content items; determining one or more other types of content items in response to the generating of the moment; and associating the one or more other types of content items with the moment.

With further regard to the system, in some implementations, the generating of the moment is triggered by a detection of a photo capture process associated with the one or more visual content items. In some implementations, the generating of the moment is triggered by a detection of a photo capture process associated with the one or more visual content items, and where the detection of the photo capture process includes detecting a preview of the one or more visual content items. In some implementations, the one or more other types of content items include at least one audio content item, where the at least one audio content item was created during a time interval associated with a time of capture of at least one of the visual content items of the moment. In some implementations, the one or more other types of content items include geographic information, where the geographic information is associated with a geographic region where at least one of the visual content items of the moment was captured.

DETAILED DESCRIPTION

Figure 1:
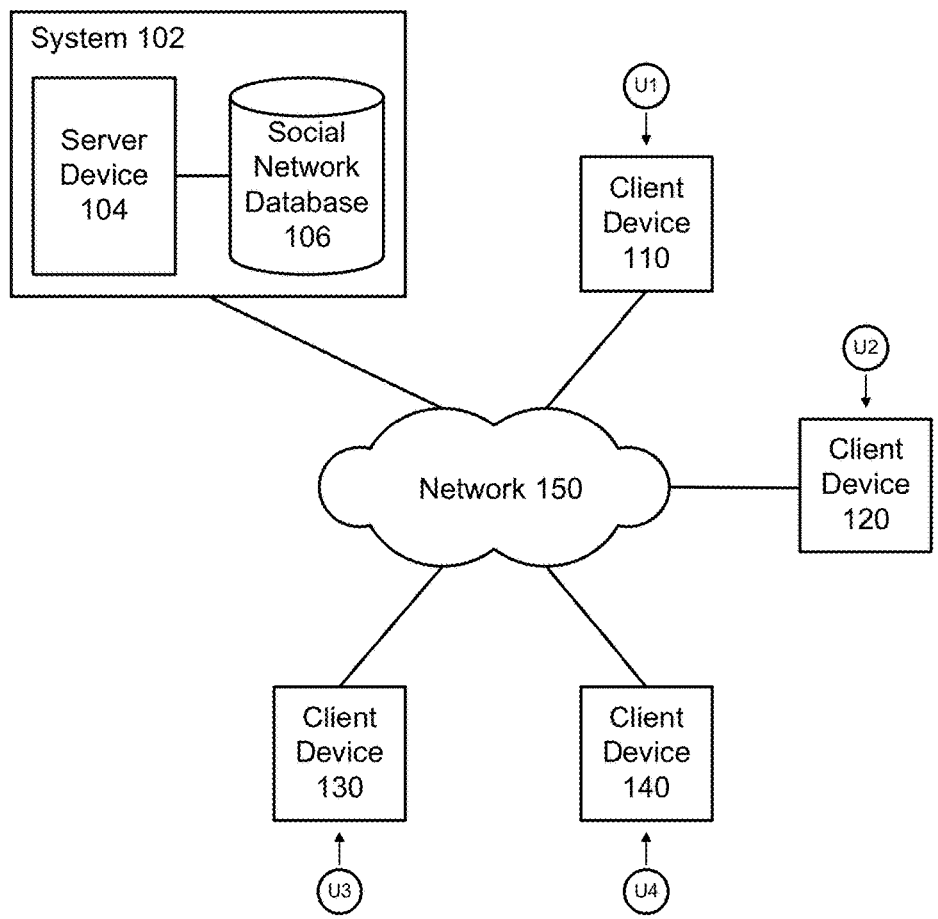
FIG. 1 illustrates a block diagram of an example network environment, which may be used to implement the implementations described herein.

Implementations described herein provide moments for users. In various implementations, a system generates a moment. As described in more detail below, a moment defines a collection of different types of content items. For example, a moment may include one or more photos. In some implementations, the generating of the moment is triggered by a detection of a photo capture process associated with the at least one photo. In some implementations, the detection of the photo capture process includes detecting a preview of the at least one photo. In some implementations, the system further determines one or more other types of content items in response to the generating of the moment. The system further associates the one or more other types of content items with the moment. As described in more detail below, the system indexes moments and provides moments to users through searches. FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and various types of databases. In various implementations, databases may include social network databases, knowledge graph databases, calendar and events databases, weather and astronomical databases, etc. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit media content to each other.

In the various implementations described herein, the processor of system 102 causes the elements described herein (e.g., photos, audio content, and other sensor information, etc.) to be displayed in a user interface on one or more display screens.

In various implementations, system 102 may utilize a recognition algorithm to detect and recognize a face and/or other objects in one or more photos. Example implementations of recognition algorithms are described in more detail below.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
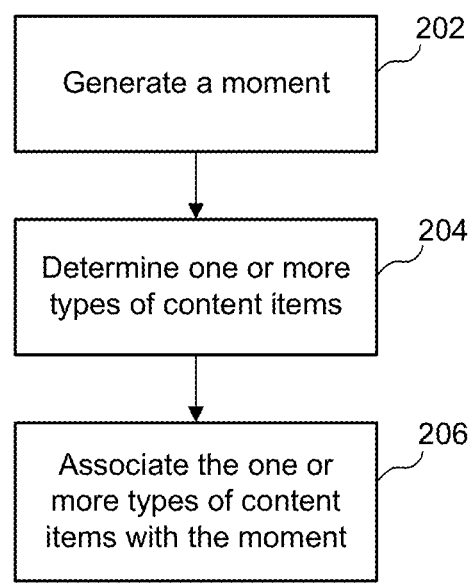
FIG. 2 illustrates an example simplified flow diagram for generating moments, according to some implementations.

FIG. 2 illustrates an example simplified flow diagram for generating moments, according to some implementations. Referring to both FIGS. 1 and 2, a method is initiated in block 202, where system 102 generates a moment. As indicated herein, a moment defines a collection of different types of content items. Such content items may include visual content items such as photos and/or videos. Content items may also include audio content items such as voice and other sound recordings. In various implementations, the moment includes one or more visual content items, where the visual content items include photos. While various implementations are described herein in the context of photos, these implementations and other also apply to other visual content items such as video.

As described in more detail herein, in various implementations, a moment may include the collection of different types of content items. In various implementations, such content items may be collected by system 102 and/or other devices such as smart phones, camera devices, etc., where content items collected by other devices are accessible by system 102. For example, some content items and other data may be collected from one or more devices via a network. In various implementations, some content items and data may be collected and cached before a given moment capture has started. This avoids network connectivity issues and provides faster processing. In some implementations, the different types of content items may be associated with one or more common events. In some implementations, the different types of content items may be associated with a common time interval, a common geographical region, etc.

In various implementations, system 102 generating the moment is triggered by a detection of a photo capture process associated with the at least one photo. In some implementations, the detection of the photo capture process includes detecting a preview of the at least one photo. For example, in some devices, the photo preview may start when the user activates a camera mode and the user can see objects to capture in the camera screen. In some devices, the photo preview may start when the device frames an object in the camera screen. In some devices, the photo preview may start when the user presses the shutter button part way to frame an object in the camera screen.

In various implementations, system 102 generating the moment may be triggered by other events. For example, the generating of the moment may be triggered by content item viewing, content item editing, content item sharing, etc. For example, in some implementations, when a user views, edits, or shares a photo, system 102 may automatically determine other content items that are appropriate to associate with the moment to which the photo is associated. In some implementations, system 102 may identify content items that where relevant to the photo and/or moment by time and/or location. For example, such content items may include news stories of events that occurred when the moment was generated, or other content items that were not originally associated with the moment, etc.

In various implementations, system 102 enables the user to edit an existing moment. In some implementations, system 102 may enable a user to indicate other content items for system 102 to associate with a moment. For example, the user may be aware of content items that have not been associated with the moment, and the may want such content items to be associated with the moment. In some implementations, system 102 may suggest content items to be associated with the moment, and may associate the content items with the moment after the user approve such associations.

In various implementations, system 102 receives the one or more photos from a user. In various implementations, the photos may be received when the user uploads the images to system 102 or after the user adds the images to one or more photo albums. In some implementations, system 102 may enable a camera device (e.g., smart phone) of the user to automatically upload images to system 102 as the camera device captures photos.

In block 204, system 102 determines one or more other types of content items in response to the generating of the moment. In various implementations, system 102 determines content items by identifying such content items and access the content items for any one or more storage locations. In various implementations, system 102 determines other types of content items from different data collected in real-time by multiple different sensors of a device. Such sensors may include one or more of a proximity sensor, gyroscope, compass, pressure sensor, barometer, accelerometer, Hall effect sensor, ambient light sensor, heart rate monitor, global positioning system (GPS), global navigation satellite system (GLONASS), Beidou navigation satellite system (BDS), step counter and detector, etc. As described in more detail herein, system 102 uses the data collected by these various sensors to generate one or more moments.

Figure 3:
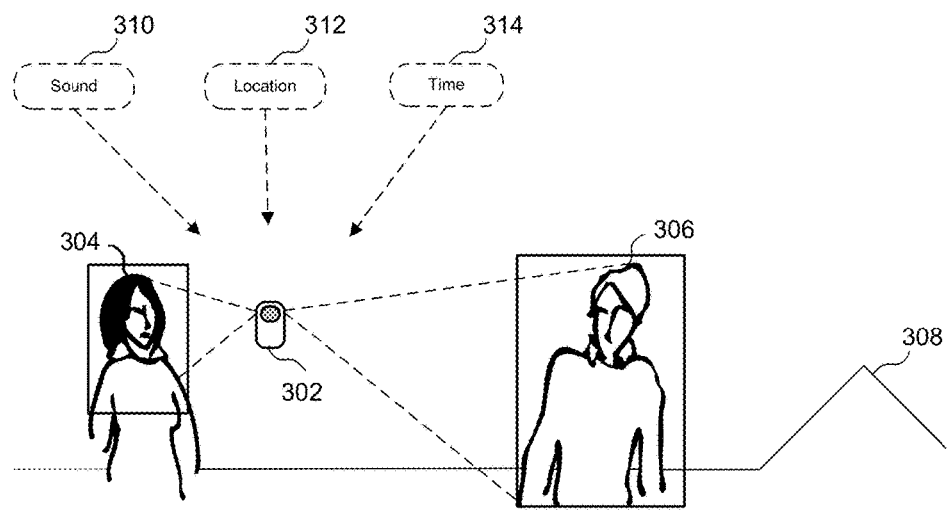
FIG. 3 illustrates an example simplified moment environment, according to some implementations.

FIG. 3 illustrates an example simplified moment environment 300, according to some implementations. Environment 300 includes objects that may be detected by sensors of a device 302. Such objects detected by the sensors may include one or more people 304 and 306, landscape 308, sound 310, geographic information 312 (labeled location 312), time 314, etc. In various implementations, system 102 first obtains user authorization before activating sensors of a device to automatically detect and recognize people, and to automatically detect sound.

Geographic information 312 may include latitude, longitude, elevation, altitude, etc. Geographic information 312 may also include semantic information (e.g., name of area, city, country, etc.). In various implementations, geographic information 312 may be obtained using any suitable sensor such as GPS, GLONASS, BDS, etc.

With regard to semantic information, in various implementations, system 102 may utilize a recognition algorithm to detect and recognize one or more objects in one or more photos. In some implementations, system 102 may use a recognition algorithm to determine associated information for a moment (e.g., temperature). For example, system 102 may detect snow on the ground. Based on the recognized snow on the ground, system 102 may determine associated information for the moment such as cold temperature. As such, for the moment, system 102 associates cold temperature with snow on the ground.

System 102 may identify and provide one or more labels (e.g., names of people, names of monuments or other background objects, logos, etc.) to associate with the moment. Example implementations of recognition algorithms are described in more detail below.

In various implementations, information detected by the various sensors may be captured in real-time. In various implementations, the content items may include one or more audio visual content items, one or more audio content items, geographic information (e.g., location), time (e.g., date, time, etc.), weather information (e.g., temperature, pressure, etc.), etc. In some implementations, where some content items include one or more audio content items, a given audio content item is related to a visual content item (e.g., photo) of the moment in that the given audio content items was created during a time interval associated with a time of capture of at least one of the visual content items of the moment. An audio data may include background sounds such as birds, water, people, comments from the user taking the photo, etc. In some implementations, where some content items include geographic information, a given content item is related to a visual content item of the moment in that the given content item (e.g., geographic information) is associated with the geographic location where the visual content item of the moment was created. Such data may also include data from remote devices and the Internet such as news events.

In various implementations, system 102 combines raw and derived data from all sensors of device 302 to generate a moment. As described in more detail below, system 102 provides the moment to the user and enables the user to playback any visual and audio information (e.g., photos, audio, etc.) as well as view other information (e.g., location, time, news events) associated with that moment. Further implementations directed to collecting multiple content items are described in more detail below.

Referring still to FIG. 2, in block 206, system 102 associates the one or more other types of content items with the moment. Association all of the content items together with the moment packages all of the content items together for later playback by the user.

In various implementations, the collecting of the audio content item as well as other data is triggered by detection of a preview of the at least one photo. Different sensors have different latencies from when they are activated to when they start collecting data to when they finish collecting data. For example, if an audio recorder of device 302 is triggered by the camera of device 302 capturing a photo triggers, there will be a small delay in the audio recorder starting to record. Furthermore, the length of time for recording would be less useful to the user if stopped too early. As such, in various implementations, an audio recording starts at a predetermined time relative to the photo capture process and ends at a predetermined time after the photo capture process.

In various implementations, system 102 enables users to specify and/or consent to the use of personal information, which may include system 102 initiating an audio recording when the moment is generated. For example, system 102 may provide users with multiple selections directed to specifying and/or consenting to the use of audio recordings. The selections may be implemented in a variety of ways. For example, system 102 may cause buttons or check boxes to be displayed next to various selections. In some implementations, system 102 enables users to specify and/or consent to audio recordings. In some implementations, system 102 may enable the user authorize particular audio recordings or all future audio recordings. System 102 may also enable the user to change such permissions as the user desires.

As indicated above, in various implementations, system 102 generating the moment is triggered by a detection of a photo capture process associated with one or more visual content items (e.g., a photo), where detection of the photo capture process includes detecting a preview of the at least one photo.

In some implementations, an audio recording starts when the preview of a photo is detected. For example, once a user activates the preview on the camera, the audio recording will start (before the picture is taken). In various implementations, the audio recording will continue for a predetermined time period after starting. For example, in some implementations, the audio recording may continue for one minute after the photo is captured. The particular predetermined time will vary and will depend on the particular implementation. These implementations may apply to other content items as well.

In various implementations, the length of a given moment is based on the content items associated with the moment. In the example above, because the moment begins when the preview of the photo capture process is detected, the length of the moment may be as long as the longest content item (e.g., the audio recording).

In some implementations, the content items may include two photos taken by two different cameras of device 302. For example, some devices such as smartphones have two cameras, one on each side of the device. As such, referring to FIG. 3, in some implementations, if user 304 takes a photo of user 306, device 302 may capture photos of both users 304 and 306 substantially simultaneously. In various implementations, device 302 may take photos of users 304 and 306 at the same time, or one right after the other.

In various implementations, a moment may result from a combination of two moments from different devices. For example, if two photos are taken in sequence while the audio recording continues, in some implementations, system 102 may generate two separate moments, one corresponding to each photo, and system 102 may combine the two moments into one, and/or system 102 may generate a single moment that contains both photos. In some implementations, where there are multiple photos taken in sequence while another content item is being captured (e.g., an audio recording), system 102 may continue the audio recording until a predetermined time after the last photo was captured.

In some implementations, system 102 may collect content items for a given moment from multiple devices. For example, photos of the same given user may be captured by different camera devices, where the owners of the different nearby camera devices may or may not know the given user captured in the photos. Each photo may have captured the same given user from different angles. In some scenarios, that given user may have been inadvertently captured in some photos in the background of those photos. System 102 may still associate those different photos with the same moment. In various implementations, system 102 may utilize a recognition algorithm to detect and recognize a face in one or more photos for inclusion in a given moment. Example implementations of recognition algorithms are described in more detail below. In cases where owners of photos do not know the user, system 102 may make such photos anonymous. In some implementations, system 102 may enable users to opt-out of photos owned by them to be associated with other user's moments.

In various implementations, system 102 accesses the content items via a moment data structure. In various implementations, a moment may be represented by a moment data structure that includes pointers to or addresses for content items. As such, system 102 may identify and access content items stored in one or more storage locations via the moment. In some implementations, system 102 may store the moment data structure in the photo file. In various implementations, system 102 may store the moment data structure in an exchangeable image file format (Exif) file, extensible metadata platform (XPM) file, or other suitable file format.

In various implementations, system 102 enables a user to access the moment, including any one or more content items associated with the moment. For example, such content items may include one or more photos, audio, location, time, etc. At playback time, system 102 combines all of the content items and renders the moment in ways that enable a compelling experience of a moment itself.

In some implementations, system 102 may enable the user to add metadata (e.g., text comments, etc.) and/or add additional content items (e.g., audio, text files, etc.) to be associated with a moment.

As such, a given moment during playback provides memories beyond mere photos. A moment provides context of photos such as who was in the photo, who took the photo, where and when the photo was taken, etc.

Figure 4:
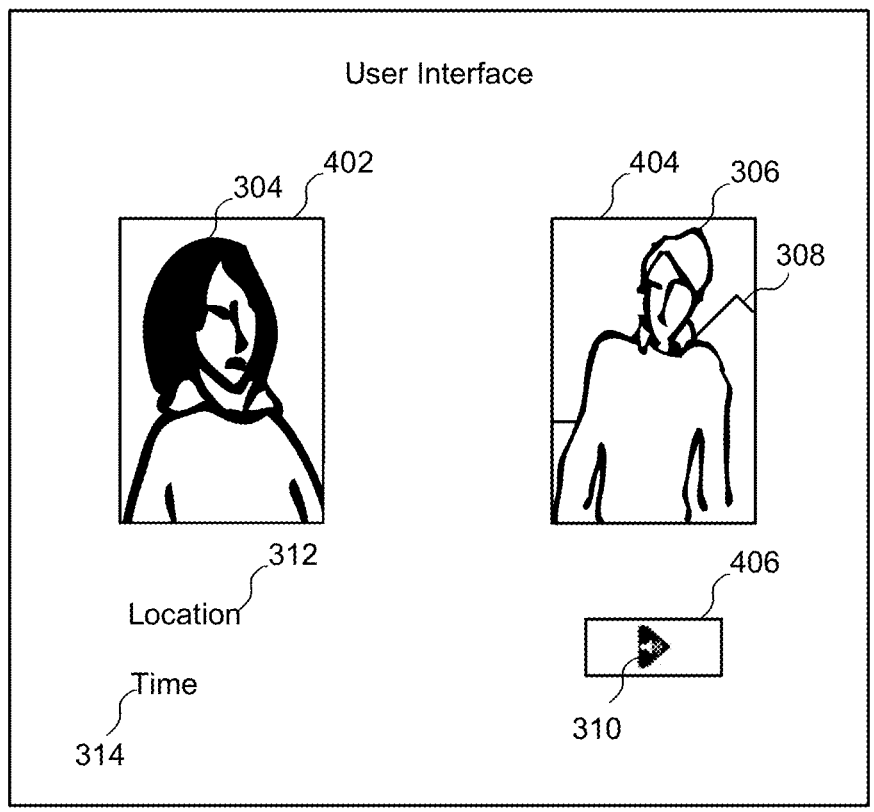
FIG. 4 illustrates an example simplified user interface showing content items of a moment, according to some implementations.

FIG. 4 illustrates an example simplified user interface 400 showing content items of a moment, according to some implementations. In various implementations, the user may enter (on a separate search page) search parameters such as a date, objects information (e.g., pyramid, etc.), etc. In response, system 102 provides various content items associated with a moment based on the search parameters.

Referring to both FIGS. 3 and 4, user interface 400 includes photos 402 and 404 of respective people 304, 306, and landscape 308 of the moment. Photo 402 shows the person 304 who took the photo. Photo 404 shows the person 306 standing in from of landscape (pyramid) 308. As shown, system 102 also displays a control 406 for play sound 310 that was recorded during the moment. System 102 also displays text indicating geographic information 312 and the time 314, etc. of the moment. In various implementations, the geographic information 312 may include semantic information (e.g., name of area, city, country, etc.) and/or geographic coordinates (e.g., latitude, longitude, elevation, etc.). In various implementations, content items may include recognized printed text in any number of languages.

In various implementations, system 102 may index moments for searches. For example, it the example of FIG. 4, system 102 may index the moment based on the owner of the moment (e.g., person 304), the person 306, objects in the landscape (pyramid) 308, sound 310, geographic information (e.g., location) 312, time 314, etc. In various implementations, system 102 enables searches of moments based on different inputs. For example, system 102 enables a user to directly identify a moment in a search. In another example, system 102 enables a user to identify persons associated with a moment. In another example, system 102 enables a user to identify place and temperature. In another example, system 102 enables a user to identify content types (e.g., moments with audio, etc.). Some of these examples and others are described in more detail below.

In various implementations, system 102 enables users to search for moments based on various search parameters that map to the indexing. Such users may include, for example, the owner of the moment and/or users which whom the owner shares the moment, or the general public if the owner authorizes public viewing. The results of a given search will vary depending on the particular search parameters. For example, if the search parameter is a name (e.g., the name of person 304), system 102 may provide all moments either owned by that person or all moments to which that person is associated. A person may be associated with a moment by being captured in a photo that is associated with the moment. In another example, if the search parameter is a name of an object (e.g., landscape/pyramid 308), system 102 may provide all moments to which a pyramid is associated.

In various implementations, system 102 may also use facial and/or object recognition to identify moments that would be relevant in a search. For example, there me be some faces or objects in photos that are not tagged in which case system 102 may use facial and/or object recognition to recognize or identify faces and/or objects in one or more photos of one or more moments. System 102 may then provide those moment in search results. Example implementations of recognition algorithms are described in more detail below.

In various implementations, system 102 dynamically configures user interface based on the content types present in a particular moment. For example, in some implementations, if a moment contains only photos, the user interface may include only a photo viewer. In some implementations, if the moment includes photos, videos, and audio, the user interface may include a photo viewer, a separate video player, and may activate the audio device. In various implementations, two or three types of content may be played concurrently.

In some implementations, system 102 renders a first user interface that enables user identification of a first moment. Upon receipt of the user identification of the first moment, system 102 then accesses a first set of content items associated with the first moment in a moment data structure. System 102 then determines a first set of content item types associated with the first set of content items. System 102 then dynamically configures and renders a second user interface for presentation of the first set of content items. In various implementations, system 102 configures the second user interface is based on the first set of content item types.

In some implementations, the first set of content item types includes a photo content item type, a video content item type, and an audio content item type. In various implementations, when configure the second user interface, system 102 may display an image viewer on the second user interface and/or display a video player on the second user interface. System 102 also activates an audio player concurrently with presentation of the second user interface. In some implementations, system 102 also causes the user interface to also present a moment with a map, where the map indicates the location of the moment.

System 102 enables the user to share the moment with others. In various implementations, system 102 stores a moment in a single file. As such, system 102 may enable the user to send the moment file to others to experience. With appropriate permissions set by the user, system 102 may also enable others to view the moment via the social network.

Implementations described herein provide various benefits. For example, implementations described herein provide visual and audio of a moment, including other information associated with the moment, and enable a user to play back.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, objects, landmarks, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of objects, where each reference image includes an image of an object that is associated with a known object or category of object. The object is known, in that system 102 has the user's identity information such as the object's name and other object information. In some implementations, a reference image may be, for example, an object image that users have uploaded. In some implementations, a reference image may be based on a composite of a group of reference images.

In some implementations, to recognize an object, system 102 may compare the object (e.g., image of the object) and match the object to reference images of the object. Note that the term "object" and the phrase "image of the object" are used interchangeably. For ease of illustration, the recognition of one object is described in some of the example implementations described herein. These implementations may also apply to each object of multiple objects to be recognized.

In some implementations, system 102 may search reference images in order to identify any one or more reference images that are similar to the object in the image. In some implementations, for a given reference image, system 102 may extract features from the image of the object in an image for analysis, and then compare those features to those of one or more reference images. For example, system 102 may analyze the relative position, size, and/or shape of object features such as facial characteristics, body characteristics, etc. In some implementations, system 102 may use data gathered from the analysis to match the object in the image to one more reference images with matching or similar features. In some implementations, system 102 may normalize multiple reference images, and compress object data from those images into a composite representation having information (e.g., object feature data), and then compare the object in the image to the composite representation for facial recognition.

In some scenarios, the object in the image may be similar to multiple reference images associated with the objects in the same category. As such, there would be a high probability that the object associated with the object in the image is the same object associated with the reference images.

In some implementations, to facilitate in object recognition, system 102 may use geometric recognition algorithms, which are based on feature discrimination. System 102 may also use photometric algorithms, which are based on a statistical approach that distills an object feature into values for comparison. A combination of the geometric and photometric approaches could also be used when comparing the object in the image to one or more references.

Other recognition algorithms may be used. For example, system 102 may use recognition algorithms that use one or more of principal component analysis, linear discriminate analysis, elastic bunch graph matching, hidden Markov models, and dynamic link matching. It will be appreciated that system 102 may use other known or later developed recognition algorithms, techniques, and/or systems. For example, system 102 may use infrared analysis of photos, geometric analysis of photos, photometric analysis of photos, etc.

In some implementations, system 102 may generate an output indicating a likelihood (or probability) that the object in the image matches a given reference image. In some implementations, the output may be represented as a metric (or numerical value) such as a percentage associated with the confidence that the object in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a recognition algorithm. Various recognition algorithms and/or visual search systems may be used to recognize objects such as faces, landmarks, logos, entities, events, faces, etc. in order to implement implementations described herein.

Figure 5:
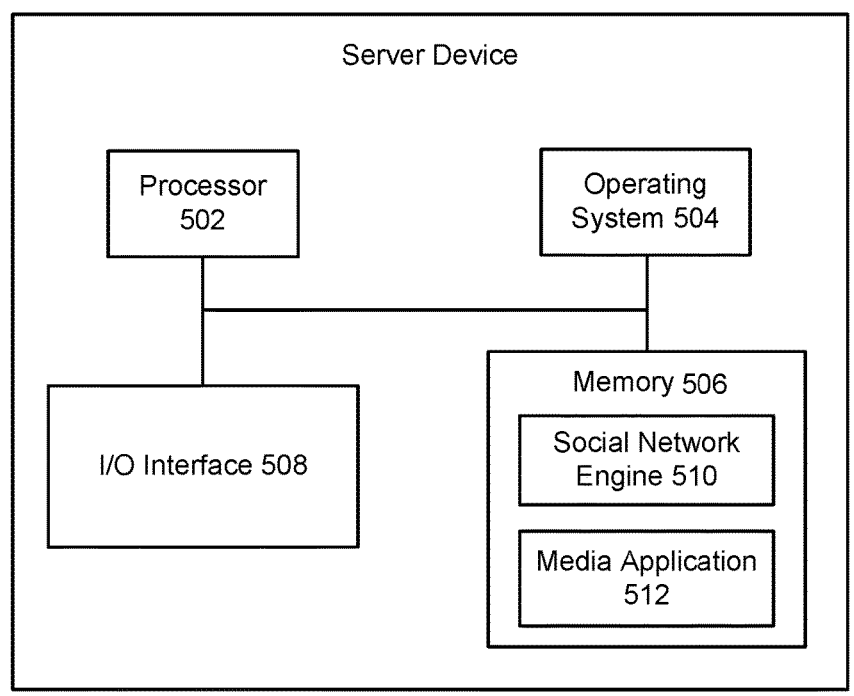
FIG. 5 illustrates a block diagram of an example server device, which may be used to implement the implementations described herein.

FIG. 5 illustrates a block diagram of an example server device 500, which may be used to implement the implementations described herein. For example, server device 500 may be used to implement server device 104 of FIG. 1, as well as to perform the method implementations described herein. In various implementations, server device 500 may be accessed over a network. In various implementations, server device 500 may be run locally on a capturing device. In some implementations, server device 500 includes a processor 502, an operating system 504, a memory 506, and an input/output (I/O) interface 508. Server device 500 also includes a social network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and media applications. In other implementations, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

What is claimed is:

1. A computer-implemented method comprising:
   generating a moment, wherein the moment includes visual content items, wherein (1) the visual content items include a first image of a first person captured by a first lens of a camera and a second image of a second person captured by a second lens of the camera, (2) the first lens and the second lens are on opposite sides of the camera, and (3) the first image is captured substantially simultaneously to when a command is received from the first person to capture the second image;
   determining two or more other types of content items in response to the generating of the moment, wherein the two or more other types of content items comprise (a) at least one audio content item that was created during a time interval associated with a time of capture of the visual content items of the moment and (b) a temperature content item that is determined, by one or more processors, based on an object in the second image being associated with a temperature;
   associating the two or more other types of content items with the moment;
   rendering a first user interface that enables user identification of the moment;
   upon receipt of the user identification of the moment, accessing a first set of content items associated with the moment in a moment data structure, wherein the first set of content items includes the visual content items and the one or more other types of content items;
   determining a first set of content item types associated with the first set of content items; and
   dynamically configuring and rendering a second user interface for presentation of the first set of content items, wherein: the configuring of the second user interface is based on the first set of content item types, the second user interface includes the first image of the first person and the second image of the second person, and two or more types of content items are played concurrently in the second user interface.

2. The method of claim 1, wherein the one or more other types of content items include a news story of an event that occurred at a time the moment was generated.

3. The method of claim 1, wherein the temperature content item includes an identification of a cold temperature based on the object being associated with the cold temperature.

4. The method of claim 1, wherein:
   the one or more other types of content items include a location associated with the moment; and
   the second user interface includes a map of the location associated with the moment.

5. The method of claim 1, wherein the one or more other types of content items comprise geographic information, and wherein the geographic information is associated with a geographic region where at least one of the visual content items of the moment was captured.

6. The method of claim 1, wherein the determining of the at least one audio content item starts when a preview of one or more of the visual content items is detected.

7. The method of claim 1, wherein the first set of content item types comprises a photo content item type, a video content item type, and an audio content item type, and wherein dynamically configuring the second user interface comprises:

displaying one or more of an image viewer and a video player on the second user interface; and
activating an audio player concurrently with presentation of the second user interface.

8. The method of claim 1, wherein the generating of the moment is triggered by a detection of a photo capture process associated with one or more of the visual content items by a device with the camera and a display screen, and wherein the detection of the photo capture process comprises detecting a preview of one or more of the visual content items based on the device framing an object in the display screen.

9. The method of claim 8, further comprising indexing the moment based on one or more objects detected by one or more sensors of the device, wherein the one or more objects include one or more of: a person, a sound, geographic information, and time, and wherein the first user interface enables user identification of the moment based on searches based on one or more of the objects.

10. The method of claim 1, wherein the two or more types of content items include a photo content item type and a video content item type, and wherein the second user interface includes a photo viewer and a video player separate from the photo viewer.

11. The method of claim 10, wherein the two or more types of content items further include an audio content item type, the method further comprising:
   activating an audio player concurrently with the rendering of the second user interface.

12. A non-transitory computer-readable storage medium carrying program instructions thereon, the instructions when executed by one or more processors cause the one or more processors to perform operations comprising:
   generating a moment, wherein the moment includes visual content items and wherein (1) the generating of the moment is triggered by a detection of a photo capture process associated with one or more of the visual content items by a device, (2) the visual content items include a first image of a first person captured by a first lens of the device and a second image of a second person captured by a second lens of the device, and (3) the first lens and the second lens are on opposite sides of the device;
   determining two or more other types of content items in response to the generating of the moment, wherein the two or more other types of content items comprise (a) at least one audio content item that was created during a time interval associated with a time of capture of the visual content items of the moment and (b) a temperature content item that is determined, by one or more processors, based on an object in the second image being associated with a temperature;
   associating the two or more other types of content items with the moment;
   indexing the moment based on one or more objects detected by one or more sensors of the device;
   rendering a first user interface that enables user identification of the moment based on searches based on one or more of the objects;
   upon receipt of the user identification of the moment, accessing a first set of content items associated with the moment in a moment data structure, wherein the first set of content items includes the visual content items and the one or more other types of content items;
   determining a first set of content item types associated with the first set of content items; and dynamically configuring and rendering a second user interface for presentation of the first set of content items, wherein the configuring of the second user interface is based on the first set of content item types and the second user interface includes the first image of the first person and the second image of the second person.

13. The computer-readable storage medium of claim 12, wherein the detection of the photo capture process comprises detecting a preview of one or more of the visual content items.

14. The computer-readable storage medium of claim 12, wherein:
the one or more other types of content items include a location associated with the moment; and
the second user interface includes a map of the location associated with the moment.

15. The computer-readable storage medium of claim 12, wherein the one or more other types of content items comprise geographic information, and wherein the geographic information is associated with a geographic region where at least one of the visual content items of the moment was captured.

16. The computer-readable storage medium of claim 12, wherein the determining of the at least one audio content item starts when a preview of one or more of the visual content items is detected.

17. A system comprising:
one or more processors; and
logic encoded in one or more tangible media for execution by the one or more processors and when executed operable to perform operations comprising:
generating a moment, wherein the moment includes visual content items, wherein (1) the visual content items include a first image of a first person captured by a first lens of a camera and a second image of a second person captured by a second lens of the camera, (2) the first lens and the second lens are on opposite sides of the camera, and (3) the first image is captured substantially simultaneously to when a command is received from the first person to capture the second image;
determining two or more other types of content items in response to the generating of the moment, wherein the two or more other types of content items comprise (a) at least one audio content item that was created during a time interval associated with a time of capture of the visual content items of the moment and (b) a temperature content item that is automatically determined based on an object in the second image being associated with a temperature;
associating the one or more other types of content items with the moment;
rendering a first user interface that enables user identification of the moment;
upon receipt of the user identification of the moment, accessing a first set of content items associated with the moment in a moment data structure, wherein the first set of content items includes the visual content items and the one or more other types of content items;
determining a first set of content item types associated with the first set of content items; and
dynamically configuring and rendering a second user interface for presentation of the first set of content items, wherein the configuring of the second user interface is based on the first set of content item types, the second user interface includes the first image of the first person and the second image of the second person, and two or more types of content items are played concurrently in the second user interface.

18. The system of claim 17, wherein the generating of the moment is triggered by a detection of a photo capture process associated with one or more of the visual content items.

19. The system of claim 17, wherein:
the one or more other types of content items include a location associated with the moment; and
the second user interface includes a map of the location associated with the moment.

20. The system of claim 17, wherein the one or more other types of content items comprise geographic information, and wherein the geographic information is associated with a geographic region where at least one of the visual content items of the moment was captured.

* * * * *